US012669158B2

(12) United States Patent
Pajak et al.

(10) Patent No.: US 12,669,158 B2
(45) Date of Patent: Jun. 30, 2026

(54) BRAKE ASSEMBLY

(71) Applicant: Honeywell International Inc.,
Charlotte, NC (US)

(72) Inventors: William E Pajak, Chesterton, IN (US);
Jonathan T. Beehler, Bremen, IN (US)

(73) Assignee: Honeywell International Inc.,
Charlotte, NC (US)

( * ) Notice: Subject to any disclaimer, the term of this
patent is extended or adjusted under 35
U.S.C. 154(b) by 451 days.

(21) Appl. No.: 18/316,093

(22) Filed: May 11, 2023

(65) Prior Publication Data

US 2024/0183417 A1 Jun. 6, 2024

Related U.S. Application Data

(60) Provisional application No. 63/385,729, filed on Dec.
1, 2022.

(51) Int. Cl.
| | |
|---|---|
| *F16D 65/52* | (2006.01) |
| *F16D 55/24* | (2006.01) |
| *F16D 65/00* | (2006.01) |
| *F16D 65/18* | (2006.01) |
| *F16D 65/78* | (2006.01) |
| *F16D 121/04* | (2012.01) |

(52) U.S. Cl.
CPC ............. *F16D 65/52* (2013.01); *F16D 55/24*
(2013.01); *F16D 65/0006* (2013.01); *F16D
65/18* (2013.01); *F16D 65/78* (2013.01); *F16D
2121/04* (2013.01)

(58) Field of Classification Search
CPC .......... F16D 55/24; F16D 55/36; F16D 55/40;
F16D 55/41; F16D 65/18; F16D 65/52;
F16D 65/0006

USPC .................................................. 188/71.5, 73.2
See application file for complete search history.

(56) References Cited

U.S. PATENT DOCUMENTS

| | | | | |
|---|---|---|---|---|
| 2,702,618 A | * | 2/1955 | Baker ...................... | F16D 48/04 |
| | | | | 192/85.33 |
| 2,925,889 A | * | 2/1960 | Albright ................. | F16D 55/10 |
| | | | | 188/18 R |
| 4,006,669 A | * | 2/1977 | Price ..................... | F16D 65/543 |
| | | | | 188/196 R |

(Continued)

FOREIGN PATENT DOCUMENTS

| | | |
|---|---|---|
| EP | 3805060 A1 | 4/2021 |
| EP | 3995368 A1 | 5/2022 |

(Continued)

OTHER PUBLICATIONS

Notice of Intent to Grant and Text Intended to Grant from counterpart European Application No. 23208363.4 dated Mar. 5, 2025, 44 pp.

(Continued)

*Primary Examiner* — Thomas J Williams
(74) *Attorney, Agent, or Firm* — Shumaker & Sieffert,
P.A.

(57) ABSTRACT

A brake assembly includes a heat sink, a piston, and a retraction plate. The retraction plate defines a lumen. The piston is mechanically separated from the retraction plate and configured to extend through the lumen defined by the retraction plate to contact the heat sink during a braking operation. The piston is configured to contact the heat sink prior to the retraction plate contacting the heat sink during the braking operation.

20 Claims, 5 Drawing Sheets

(56)  References Cited

U.S. PATENT DOCUMENTS

| 4,023,654 | A | * | 5/1977 | Winzeler | F16D 63/00 |
| | | | | | 188/170 |
| 4,193,179 | A | * | 3/1980 | Confer | B23P 15/10 |
| | | | | | 72/110 |
| 4,815,359 | A | * | 3/1989 | Black | F16D 55/40 |
| | | | | | 188/196 R |
| 5,366,047 | A | * | 11/1994 | Beck | F16D 65/0006 |
| | | | | | 188/72.4 |
| 6,016,892 | A | | 1/2000 | Berwanger | |
| 7,971,689 | B2 | * | 7/2011 | Moore | F16D 65/18 |
| | | | | | 188/26 |
| 8,205,724 | B2 | * | 6/2012 | Osawa | F16D 65/0006 |
| | | | | | 188/196 A |
| 9,476,471 | B2 | | 10/2016 | Bussiere et al. | |
| 11,428,287 | B2 | | 8/2022 | Campbell | |
| 2010/0012440 | A1 | | 1/2010 | Vu | |
| 2013/0277155 | A1 | * | 10/2013 | Huang | F16D 65/127 |
| | | | | | 164/75 |
| 2016/0176518 | A1 | | 6/2016 | Eyanga et al. | |
| 2019/0219113 | A1 | * | 7/2019 | Rankin | F16D 65/0068 |
| 2021/0388877 | A1 | | 12/2021 | Babicki et al. | |
| 2024/0183417 | A1 | * | 6/2024 | Pajak | B60T 5/00 |

FOREIGN PATENT DOCUMENTS

| GB | 1302216 | A | 1/1973 |
| WO | 1994013973 | A1 | 6/1994 |

OTHER PUBLICATIONS

Extended Search Report from counterpart European Application No. 23208363.4 dated Apr. 18, 2024, 6 pp.

Response to Extended Search Report dated Apr. 18, 2024, from counterpart European Application No. 23208363.4 filed Jul. 8, 2024, 23 pp.

* cited by examiner

BRAKE ASSEMBLY

This application claims the benefit of U.S. Provisional Patent Application No. 63/385,729, entitled "BRAKE ASSEMBLY" and filed on Dec. 1, 2022, which is incorporated herein by reference in its entirety.

TECHNICAL FIELD

The disclosure relates to brake systems of a vehicle.

BACKGROUND

Vehicles, such as aircrafts, may use a wheel brake system that includes a brake assembly. For example, the brake assembly may include a disc stack, which may alternatively be called a heat sink. The disc stack, or heat sink, includes a plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel during a braking operation, the brake assembly may displace pistons to compress the rotating rotor discs engaged with the wheel against the stationary stator discs, therefore producing torque that decelerates the rotational motion of the wheel. The pistons may then be displaced away from the heat sink to allow the wheel to rotate when the braking operation of the vehicle is ceased.

SUMMARY

In some examples, the disclosure is directed to a brake assembly which includes a heat sink, a piston, and a retraction plate. The piston is mechanically separated from (i.e., not mechanically attached to) the retraction plate, and the piston is configured to extend through the retraction plate to contact the heat sink during a braking operation prior to the retraction plate contacting the heat sink.

In some examples, the disclosure is directed to a technique for making a brake assembly. The technique includes positioning a retraction plate adjacent to a heat sink, wherein the retraction plate defines a lumen. The technique also includes positioning a piston adjacent to the retraction plate. The piston is mechanically separated from the retraction plate. The piston is configured to extend through the lumen defined by the retraction plate to contact the heat sink during a braking operation prior to the retraction plate contacting the heat sink.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
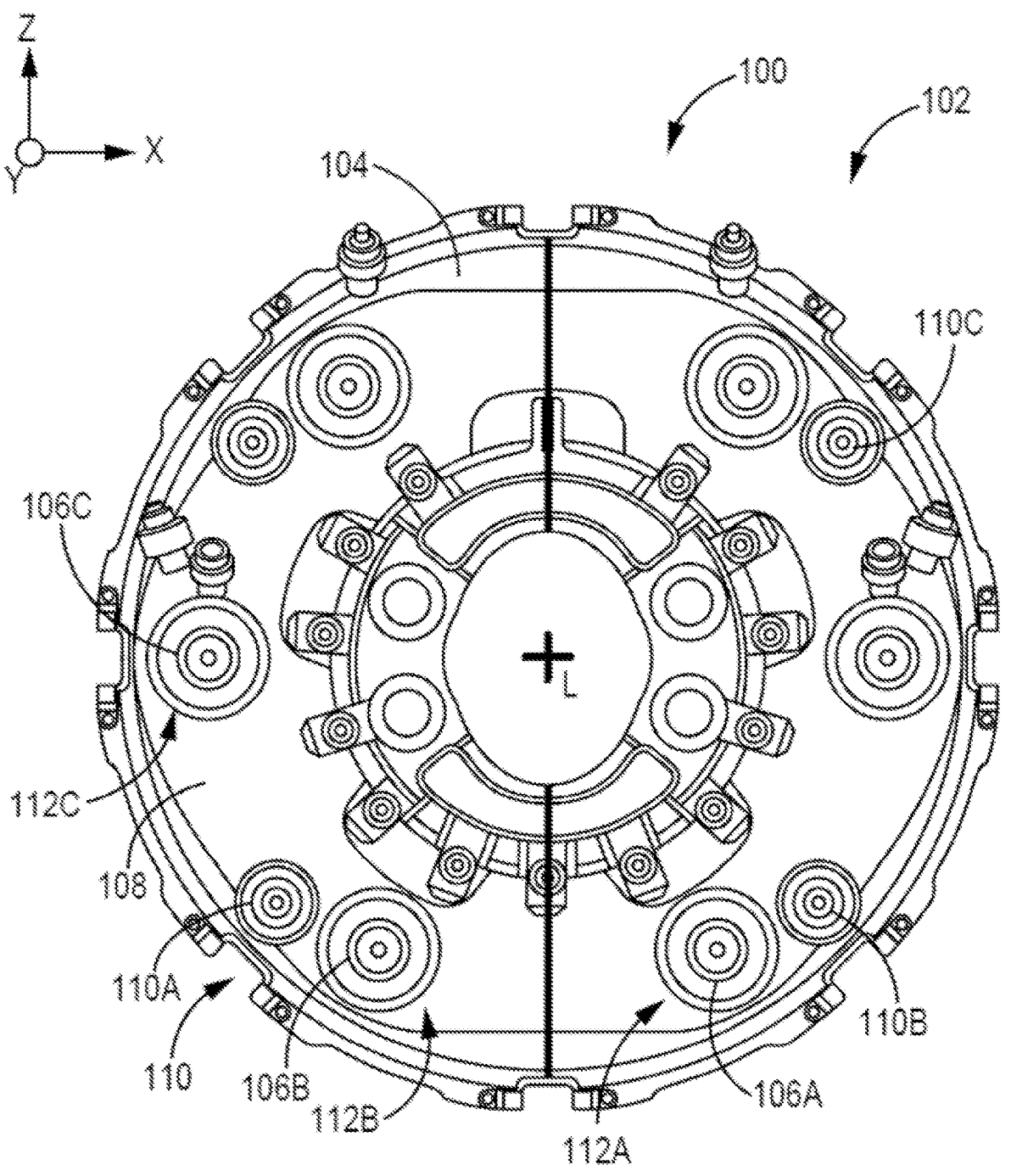
FIG. 1 is a schematic side view illustrating an example braking assembly according to the present disclosure.

Vehicle braking assemblies, for example aircraft brake assemblies, may drive one or more pistons to compress a disc stack, or heat sink, during a braking operation. A braking operation, as used herein, is an operation of a vehicle to decelerate or stop rotational motion of a rotating wheel of the vehicle. The compression of the heat sink may generate friction between rotating discs of the disc stack and non-rotating discs of the disc stack, yielding deceleration of the vehicle.

The one or more pistons of the brake assembly may be driven by any suitable mechanism, including, for example, a hydraulic system which drives the one or more pistons using a pressurized liquid, a pneumatic system which drives the one or more pistons using a compressed gas, an electrical system, a mechanical system, or a combination of these or other systems. Regardless of how the one or more pistons are driven to compress the heat sink, the one or more pistons are configured to drive against a retraction plate, which may be configured to be disposed between the one or more pistons during a braking operation. The retraction plate may be configured to apply pressure to the heat sink to compress the heat sink during a braking operation, and displace from the heat sink during non-braking operations to create a clearance between the retraction plate and the heat sink. The clearance allows the wheel to spin under reduced friction during non-braking operations, relative to braking operations. The retraction plate also serves the dual-purpose of serving as a heat shield separating the heat sink, which may generate extreme temperatures during braking operations, from other components of the brake assembly (e.g., a hydraulic system) or other components of the vehicle (e.g., landing gear of an aircraft). Accordingly, the retraction plate may also be called a heat shield.

In some examples, an adjuster system may be used to displace the retraction plate from the heat sink (e.g., in a direction opposite the direction in which the piston is driven during a braking operation) when a braking operation is ceased. The adjuster system may include an adjuster device, and the adjuster device may include a spring configured to apply a spring force in a direction opposite the direction in which the piston is driven during a braking operation. Thus, a clearance may be created between the heat sink and the retraction plate which allows the vehicle to accelerate or cruise without compression of the heat sink. In some examples, the adjuster system may be an internal adjuster system in which a spring is housed internal to a piston of the one or more pistons of the brake assembly. Alternatively, the adjuster system may be an external adjuster system which is located remotely from the piston. For example, an external adjuster system may include an adjuster pin coupled to the retraction plate configured to displace the retraction plate from the heat sink to the default position in which the retraction plate is separated from the heat sink by a clearance. Thus, the retraction plate must be configured to be rigid and stiff enough to withstand the heat and be able to retract the pistons as part of the adjuster system in order to create clearance in non-braking operations.

Although friction surfaces of the heat sink are generally designed to be flat, smooth, and planar, the heat sink may include imperfections on one or more friction surfaces. These imperfections may be areas of the friction surface which are not flat, smooth, and/or planar, and may be caused by uneven wear, machining tolerances, distortion of materials of construction (e.g., carbon or steel), or the like. The imperfections in the friction surfaces may be formed due to the high temperatures and extreme environments involved in such applications. These imperfections may cause vibration during braking operations when the heat sink is compressed.

In some examples, the retraction plate may be mechanically attached to other components within the brake assembly, the brake assembly may be mechanically attached to the wheel, and the wheel may be mechanically attached to the landing gear or other parts of the vehicle. It follows that in examples where the one or more pistons are driven to force the retraction plate against the heat sink during a braking operation, the vibrations caused during braking operations may propagate through some or all of these mechanically attached systems and components. Vibrations that are allowed to propagate into the brake assembly, wheel, or landing gear may have deleterious effects on the affected parts. For example, vibrations may cause material fatigue which negatively impacts the useful life of the component.

In some examples according to the present disclosure, the retraction plate defines a lumen. Rather than pushing the retraction plate into the heat sink to compress the heat sink, the piston may be configured to extend through the lumen and protrude from the retraction plate proximate to the heat sink, such that the piston contacts the heat sink prior to the retraction plate contacting the heat sink during a braking operation. The brake assembly may be configured such that the retraction plate contacts the heat sink after the piston contacts the heat sink during braking, or the retraction plate may not contact the heat sink at all during braking operations. In some examples, the piston may not be mechanically attached to the retraction plate. Thus, the piston is configured to compress the heat sink rather than the retraction plate compressing the heat sink. Advantageously, since the piston is mechanically separated from the retraction plate, vibrations caused by the friction surface(s) of the heat sink may not propagate, or only propagate at a reduced rate, through individual pistons, which are more compliant to vibration and can dampen the effects, to the wheel and/or landing gear. Since the retraction plate may not contact the heat sink, the retraction plate may, in some examples, be isolated from these vibrations. Thus, problems created by unwanted vibrations may be mitigated.

In some examples where the retraction plate defines a lumen, the piston may be covered at a first end proximate the heat sink by a piston cap. In examples described herein, the piston cap may be considered to be part of the piston, because the piston cap is mechanically attached to the piston and not mechanically attached to the retraction plate. As used herein, mechanically attached means physically joined or connected, either directly or indirectly through intervening elements. Components that contact each other without being physically joined or connected are not mechanically attached. Components that are mechanically separated from each other are components that are not mechanically attached to each other.

The piston cap may be a durable member configured to directly contact the heat sink, protecting the piston. In some examples, the piston cap may include a shoulder which extends radially from the piston and seats within a recess in the retraction plate without mechanically attaching to the retraction plate. The retraction plate may thus be displaced toward the heat sink with the piston during a braking operation, forming an interactive mounting feature that allows the piston to retract when brake pressure is removed, but also pulls the retraction plate forward during braking applications. In some cases the piston cap could be neither mechanically attached to the piston or the retraction plate. The piston cap could be trapped in assembly between the piston and the retraction plate. The piston cap could pilot onto the OD or ID of the piston and pass through the lumen on the retraction plate with the shoulder of the piston cap fitting into a recess of the retraction plate. For the purposes of this disclosure in such case the piston cap will be considered part of the piston even though it is mechanically separate from the piston.

In some examples, the one or more pistons may include a plurality of pistons, such as, for example, four, five, six, or more pistons. The pistons may be distributed radially about a central axis of the brake assembly. In examples where the pistons are mechanically separated from the retraction plate and configured to extend through the retraction plate, individual pistons of the plurality of pistons are free to pulse and momentarily separate from the retraction plate as relatively high and low spots on the heat sink present themselves during braking. Example brake assemblies where the piston is mechanically separated from the retraction plate and extends through the lumen defined by the retraction plate may be advantageous in brake assemblies which include a high-pressure hydraulic system, such as, for example, greater than or equal to about 3,000 pounds per square inch (psi), or greater than or equal to about 4,000 psi. The trend in brake systems is to include higher pressure hydraulic systems, 4,000 psi or greater, that require smaller piston sizes to actuate the amount of force required for the system, leading to more designs with external adjusters. These systems may particularly benefit from brake assemblies according to the present disclosure.

FIG. 1 is a schematic side view illustrating example brake assembly 100. Brake assembly 100 is included as part of a brake system of vehicle 102. Although primarily described herein as an aircraft, vehicle 102 may be another type of vehicle, such as a land vehicle or a marine vehicle. Brake assembly 100 includes central axis L extending into the page along the Y-direction. In some examples, central axis L may be collinear with an axis of a wheel (not pictured) of vehicle 102.

Brake assembly 100 includes heat sink 104, pistons 106A, 106B, 106C (collectively, "pistons 106"), and retraction plate 108, which are configured to interact to decelerate vehicle 102 during a braking operation. Brake assembly 100 may also include other elements or systems not pictured. For example, brake assembly 100 may include a housing or other mechanical support elements, which may mechanically support brake assembly 100 and protect components of brake assembly 100 from impact and/or the external environment. Additionally, brake assembly 100 may include a system configured to drive pistons 106 to compress heat sink 104, such as a hydraulic system, a pneumatic system, an electrical system, a mechanical system, or combinations thereof. The electrical system may be configured to allow for control of brake assembly 100 by an operator, such as a pilot, through a controller.

Heat sink 104 includes a plurality of rotor discs engaged with a wheel and a plurality of stator discs interleaved with the rotor discs. The rotor discs and wheel are configured to rotate around central axis L, while the stator discs remain stationary. To decelerate rotational motion of a rotating wheel during a braking operation, pistons are driven to compress the rotating rotor discs engaged with the wheel against the stationary stator discs within heat sink 104, therefore producing torque that decelerates the rotational motion of the wheel. In some examples, brake assembly 100 may be a carbon brake, and as such heat sink 104 may include carbon. Additionally, or alternatively, heat sink 104 may include steel. Heat sink 104 including carbon may provide benefits including increased temperature resistance and/or reduced weight.

Retraction plate 108 is configured to displace toward heat sink 104 (into the page in FIG. 1) during braking operations, and displace away from heat sink 104 (out of the page in FIG. 1) during non-braking operations. Retraction plate 108 may include a strong and tough material configured to interact with heat sink 104. A strong material, as defined herein, is a material which provides a stiff, rigid interface to transfer forces between the pistons 106 and the adjuster system 110. A tough material, as defined herein, does not break down through interaction with heat sink 104 or operation within the extreme environment of brake assembly 100. Retraction plate 108 is also configured to act as a heat shield protecting pistons 106 and, for example, the hydraulic system configured to drive the pistons from the extreme heat generated by heat sink 104. As such, retraction plate 108 may be called a heat shield. Brake assembly 100 may include additional heat shields beyond retraction plate 108. In one non-limiting example, retraction plate 108 may include steel.

In some examples, retraction plate 108 may be disposed between pistons 106 and heat sink 104 during a braking operation. In such examples, retraction plate 108 may be forced toward heat sink 104 by pistons 106 when pistons 106 are driven, such that retraction plate 108 compresses heat sink 104 to decelerate vehicle 102.

Figure 3:
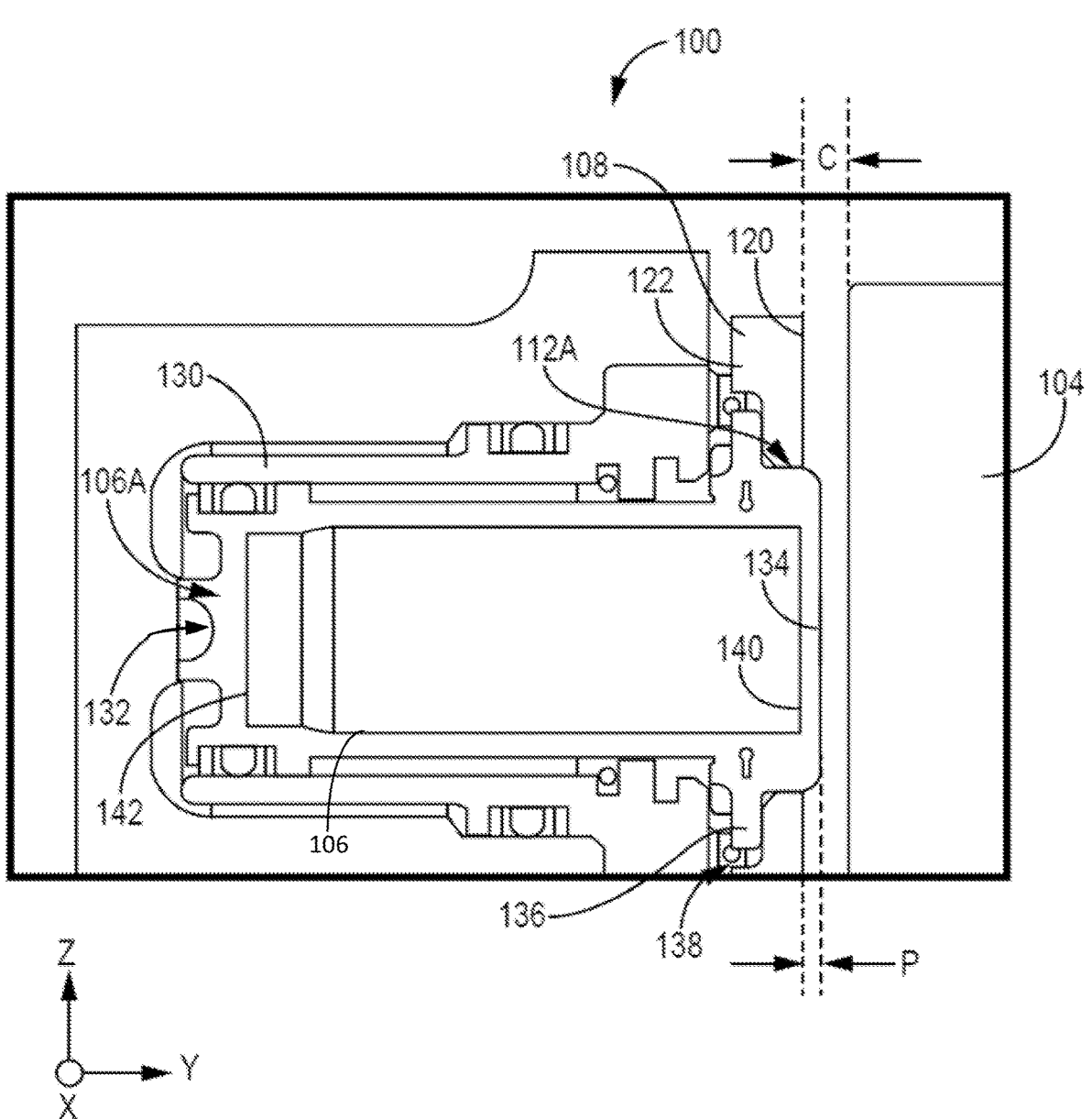
FIG. 3 is a schematic cross-sectional view of an example portion of a braking assembly according to the present disclosure.

Alternatively, in examples according to the present disclosure as best illustrated in FIG. 3, retraction plate 108 may define lumens 112A, 112B, 112C (collectively "lumens 112"). Pistons 106 may extend through retraction plate 108 to contact heat sink 104. In such examples, retraction plate 108 may or may not be configured to also contact heat sink 104. If retraction plate 108 contacts heat sink 104, it may be configured to do so only after pistons 106 contact heat sink 104. Pistons 106 may be configured to extend through lumens 112 defined by retraction plate 108 to contact heat sink 104 during a braking operation, and pistons 106 may be configured to contact heat sink 104 prior to retraction plate 108 contacting heat sink 104 during the braking operation.

Figure 2:
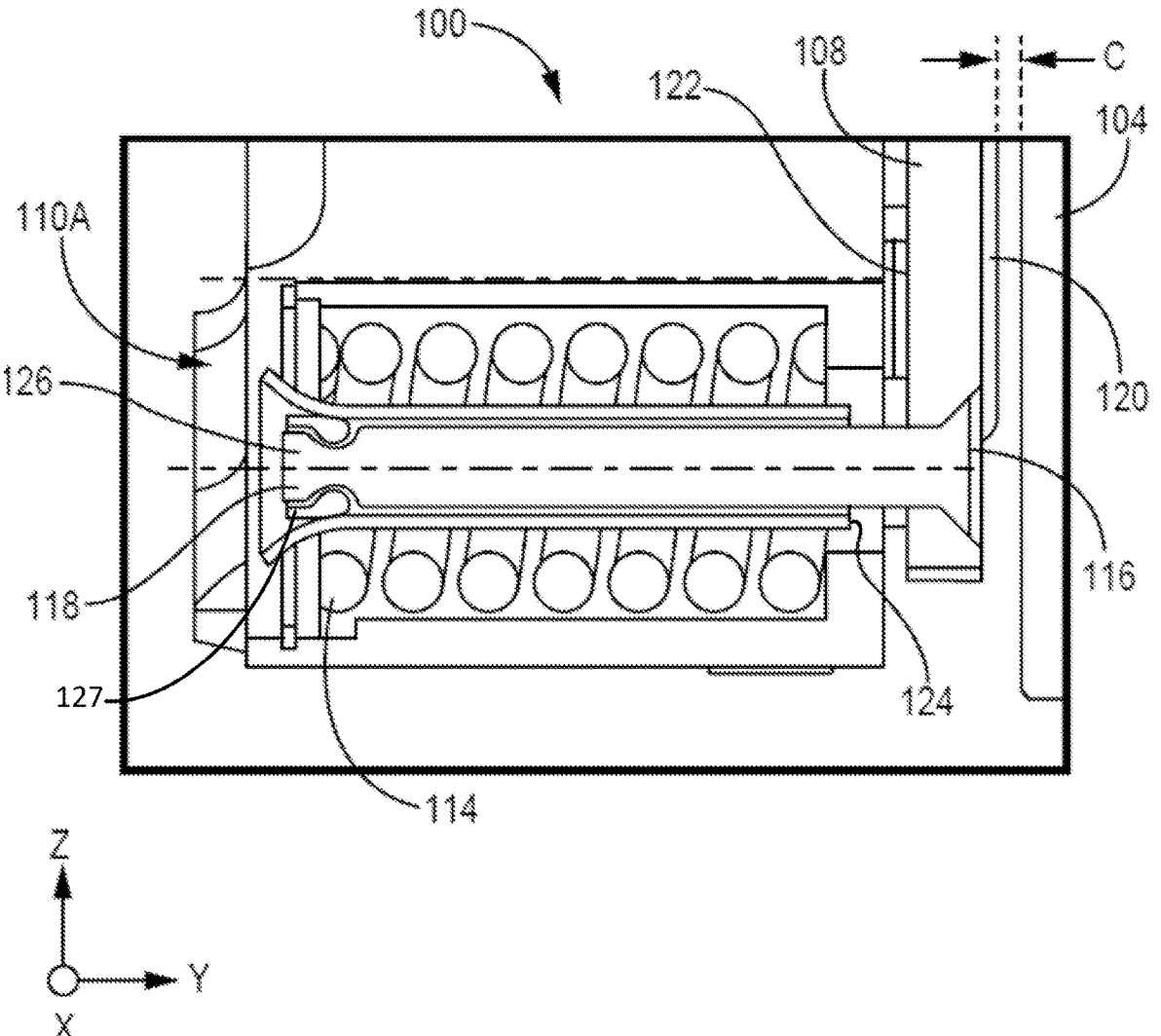
FIG. 2 is a schematic cross-sectional view of an example portion of a braking assembly according to the present disclosure.

Brake assembly 100 includes adjuster system 110. Adjuster system 110 may be a mechanical system which includes adjuster devices 110A, 110B, 110C (collectively, "adjuster devices 110) that are configured to displace retraction plate 108 away from heat sink 104 (out of the page in FIG. 1) when vehicle 102 is in a non-braking operation, creating clearance C (FIG. 2). In the illustrated example of FIG. 1, adjuster devices 110 are external adjusters, which are located remotely from pistons 106 and connected by an adjuster pin to retraction plate 108.

In some examples, pistons 106 may not be mechanically attached to retraction plate 108. Pistons 106 may be configured to extend through lumens 112 to compress heat sink 104. In this way, the stiffer and more rigid retraction plate 108, which may be mechanically attached to other components of brake assembly 100 and/or vehicle 102, may be isolated from contacting heat sink 104, thus eliminating potential vibration modes induced by the stiffer retraction plate during braking operations. Configured in this way the useful life of brake assembly 100 may be lengthened, and may provide increased braking control, response, and stability. Other benefits may include improved thermal protection of the piston housing and brake fluid, catalytic oxidation protection to the heat sink.

FIG. 2 is a schematic cross-sectional view of an example portion of brake assembly 100 of FIG. 1, illustrating a close-up cross-sectional view of adjuster device 110. As mentioned above, adjuster device 110 is an external adjuster arrangement.

Adjuster device 110 includes an adjuster pin 126 which is countersunk at first end 116 into retraction plate 108, such that first end 116 of adjuster pin 126 is positioned between first surface 120 of retraction plate 108 and second surface 122 of retraction plate 108. First surface 120 of retraction plate 108 is proximal to heat sink 104, and second opposite surface 122 of retraction plate 108 is distal to heat sink 104.

Adjuster pin 126 extends from first end 116 to second end 118 opposite first end 116. Spring 114 surrounds adjuster pin 126 for at least a portion of the length of adjuster pin 126. Spring 114 is fixed near second end 118 of adjuster pin 126. When pistons 106 (FIG. 1) are driven toward heat sink 104, spring 114 compresses, allowing retraction plate 108 to be displaced toward heat sink 104, reducing clearance C, which is the gap between retraction plate 108 and heat sink 104. In some examples, as illustrated in FIG. 2, at system pressures configured for releasing brake torque (i.e. the vehicle is in a non-braking operation) the adjuster pin 126 coupled with expander device 127 may be prevented from being displaced by adjuster tube 124. Thus, the spring causes retraction plate 108 to displace in the direction away from heat sink 104 by pushing adjuster tube 124 in the direction away from heat sink 104, such that retraction plate 108 returns to the default position where clearance C is maintained between retraction plate 108 and heat sink 104 throughout the life of the brake. In such a state, rotating components of heat sink 104 are allowed to rotate freely.

External adjuster device 110 advantageously allows for smaller diameter pistons 106 relative to internal adjuster arrangements, because the pistons do not require a spring. An external adjuster arrangement may result in reduced fluid volume, which may reduce the weight of the vehicle. Further advantages may include one or more of balanced static and dynamic torque capability, increased pressure torque response, improved pressure-torque sensitivity control, and/or improved reliability through elimination of extra adjuster pin seals.

FIG. 3 is a schematic side view of an example portion of a braking assembly according to the present disclosure. FIG. 3 illustrates a schematic close-up view of piston 106A and the associated bushing assembly 130 of FIG. 1. Bushing 130 is used to contain piston 106A within the larger hydraulic system.

Piston 106A extends from first end 140 proximal to heat sink 104 to second opposite end 142 distal to heat sink 104. Piston 106A includes a pressurized side 132 at second end 142. Pressurized side 132 connects piston 106A to a hydraulic system for driving piston 106A towards heat sink 104.

Retraction plate 108 is configured to act as a heat shield and, as such, is made from a tough, heat resistant material such as steel. Retraction plate 108 defines lumen 112A passing through retraction plate 108 from first surface 120 to second surface 122. Piston 106A is configured to extend through retraction plate 108 from second surface 122 to first surface 120 and protrude a distance P into clearance C between first surface 120 of retraction plate 108 and heat sink 104. Thus, piston 106A is configured to contact heat sink 104 before retraction plate 108 contacts heat sink 104 during a braking operation.

Piston 106A includes piston cap 134, which is configured to interact with heat sink 104 and protect piston 106A. Piston cap 134 may be made out of any suitable tough material, such as, for example, steel. Piston cap 134 covers first end 140 of piston 106A. and may extend along a portion of the length of piston 106A between first end 140 and second end 142.

In some examples, as illustrated, piston cap 134 includes shoulder 136. shoulder 136 may be a lip or ridge which extends radially from piston 106A (up and down on the page in FIG. 3). In some examples, shoulder 136 may be configured to seat in recess 138 of retraction plate 108. During a braking operation of vehicle 102, piston 106A may be driven towards heat sink 104, and may displace retraction plate 108 towards heat sink 104. Piston cap 134 is configured to contact and compress heat sink 104, decelerating vehicle 102. When the braking operation is ceased, retraction plate 108, and piston 106A, may be forced back to the default position at clearance C by adjuster system 110.

Piston 106A is mechanically separated from (i.e., not mechanically attached to) retraction plate 108. Bushing assembly 130 is mechanically attached to retraction plate 108 either directly or indirectly and supports and constrains piston 106A while piston 106A is allowed to translate within bushing assembly 130. Therefore, vibrations induced by imperfections in friction surfaces of heat sink 104 may not propagate, or only propagate at a reduced rate through the individual pistons 106 to other components of the brake assembly.

Figure 4A:
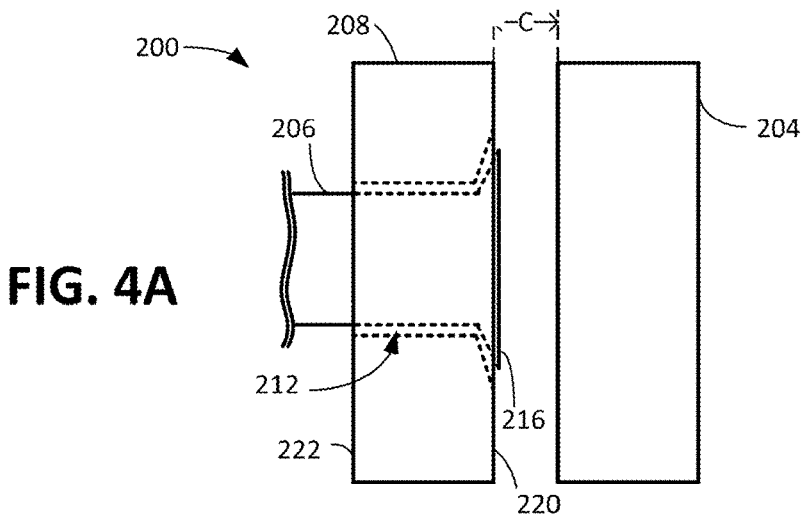
FIGS. 4A-4C illustrate an example braking assembly during different stages of a braking operation.
Figure 4B:
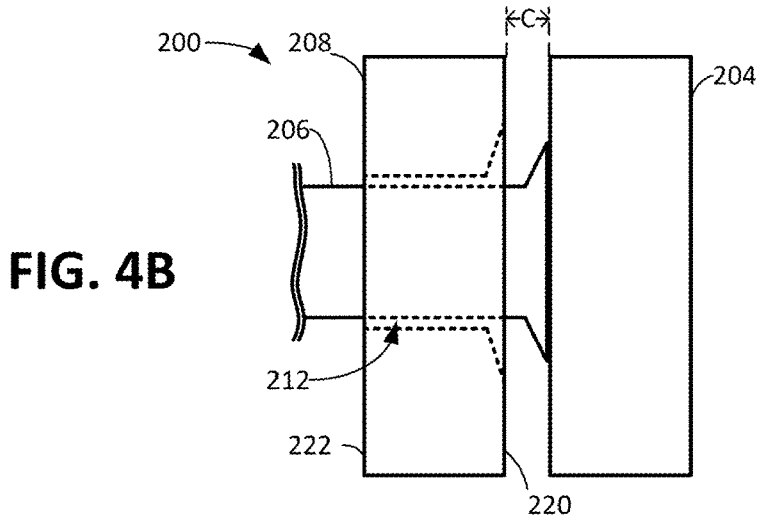
Figure 4C:
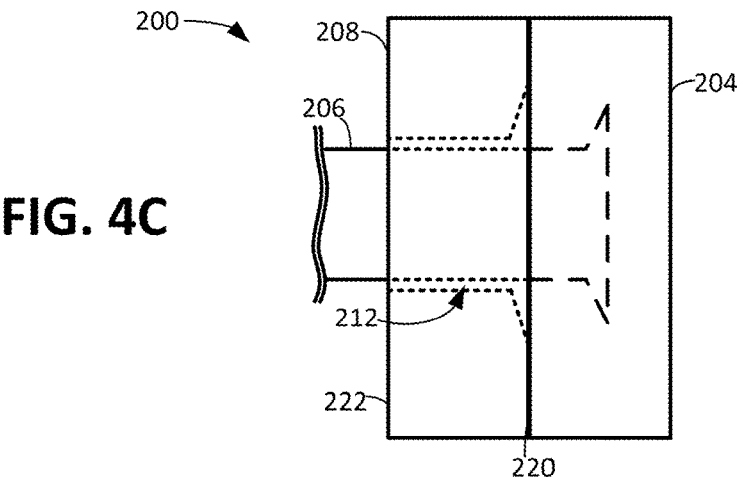

FIGS. 4A-4C illustrate a portion of example braking assembly 200 during different stages of a braking operation. The conceptual illustration are side views, with hidden elements in broken lines. Braking assembly 200 of FIGS. 4A-4C may be an example of braking assembly 100 of FIGS. 1-3, and may be described similarly, with similar reference numbers indicating similar elements. FIG. 4A illustrate braking assembly 200 in a non-braking operation, with piston 206 seated within lumen 212 of retraction plate 208 and clearance C separating retraction plate 208 and heat sink 204. In some examples, retraction plate 208 is configured to serve an additional safety function, as such, is made from a strong, stiff material such as steel. Retraction plate 208 defines lumen 212 passing through retraction plate 208 from first surface 220 to second surface 222. Piston 206 is configured to extend through retraction plate 208 from second surface 122 to first surface 120 into clearance C between to contact heat sink 104 to provide braking during a braking operation, as illustrated in FIG. 4B. Thus, piston 206 is configured to contact heat sink 204 before retraction plate 208 contacts heat sink 204 during a braking operation. However, as illustrated in FIG. 4C, if the heat sink 204 oxidizes and allows for piston 206 to begin to punch through heat sink 204 (e.g., a first stationary stage of heat sink 204), retraction plate 208 may contact heat sink 204 may contact heat sink 204, increasing the surface area in contact with heat sink 204, preventing further protrusion of piston 206 through heat sink 204.

Figure 5:
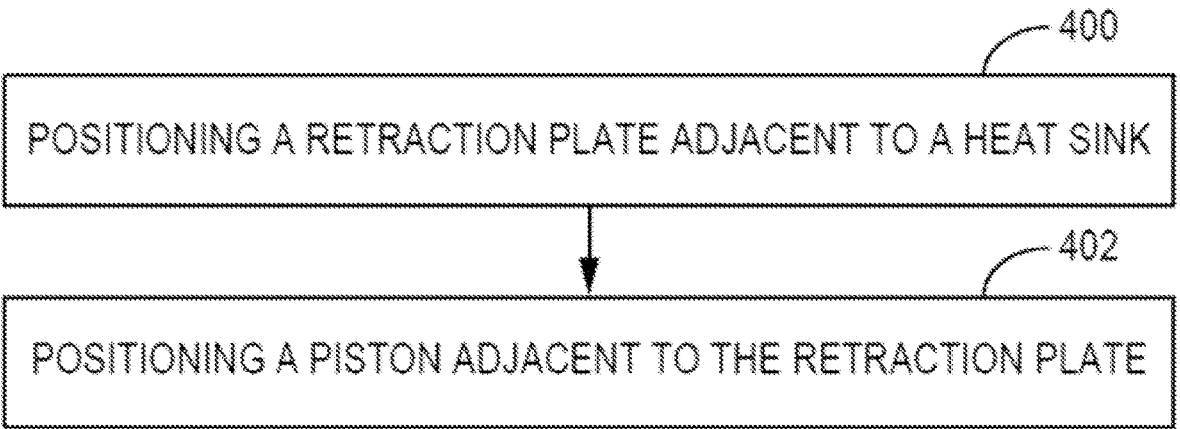
FIG. 5 is a flowchart illustrating an example technique for forming a braking assembly according to some examples of the present disclosure.

FIG. 5 is a flowchart illustrating an example technique for forming a braking assembly according to some examples of the present disclosure. While described with respect to example brake assembly 100 of FIGS. 1-3, it will be understood that the technique of FIG. 5 may be used to form other brake assemblies, and brake assembly 100 may be formed by other techniques.

The technique of FIG. 5 includes positioning retraction plate 108 adjacent to heat sink 104 (400). Retraction plate 108 defines lumen 112A.

The technique of FIG. 5 also includes positioning piston 106A adjacent to retraction plate 108 (402). Piston 106A is mechanically separated from retraction plate 108. Piston 106A is configured to extend through lumen 112A to contact heat sink 104 during a braking operation of vehicle 102 prior to retraction plate 108 contacting heat sink 104.

The following numbered clauses illustrate one or more aspects of the devices and techniques described in this disclosure.

Clause 1A. A brake assembly comprising: a heat sink; a piston; and a retraction plate defining a lumen; wherein the piston is mechanically separated from the retraction plate, and wherein the piston is configured to extend through the lumen defined by the retraction plate to contact the heat sink during a braking operation, wherein the piston is configured to contact the heat sink prior to the retraction plate contacting the heat sink during the braking operation.

Clause 2A. The brake assembly of clause 1A, further comprising an adjuster system configured to retract the piston from the heat sink when the brake assembly is not in a braking operation.

Clause 3A. The brake assembly of clause 2A, wherein the adjuster system comprises a spring.

Clause 4A. The brake assembly of any of clauses 1A-3A, further comprising a hydraulic system configured to drive the piston to contact the heat sink during a braking operation.

Clause 5A. The brake assembly of any of clauses 1A-4A, wherein the piston comprises a first end proximate the heat sink and a second opposite end, and wherein the assembly comprises a piston cap covering the first end of the piston and configured to be disposed between the piston and the heat sink during a braking operation.

Clause 6A. The brake assembly of clause 5A, wherein the piston cap comprises a tough material, such as steel.

Clause 7A. The brake assembly of clause 5A or clause 6A, wherein the piston cap includes a shoulder extending radially, relative to a central axis of the brake assembly, from the piston.

Clause 8A. The brake assembly of any of clauses 1A-7A, wherein the heat sink comprises at least one of steel, carbon, or a ceramic material.

Clause 9A. The brake assembly of any of clauses 1A-8A, wherein the brake assembly comprises a plurality of pistons.

Clause 10A. The brake assembly of any of clause 9A, wherein the brake assembly defines a central axis, wherein the plurality of pistons are distributed radially about the central axis.

Clause 11A. The brake assembly of any of clauses 1A-10A, wherein the retraction plate is configured to not contact the heat sink during a braking operation, such that vibration from the heat sink does not propagate from the heat sink through the rigid retraction plate, thus reducing or eliminating impacts of vibration during the braking operation.

Clause 1B. A method of making a brake assembly, the method comprising: positioning a retraction plate adjacent to a heat sink, wherein the retraction plate defines a lumen; positioning a piston adjacent to the retraction plate; wherein the piston is mechanically separated from the retraction plate, and wherein the piston is configured to extend through the lumen defined by the retraction plate to contact the heat sink during a braking operation prior to the retraction plate contacting the heat sink.

Clause 2B. The method of clause 1B, further comprising mechanically supporting the retraction plate with an adjuster system, wherein the adjuster system is configured to retract the piston from the heat sink when the brake assembly is in a non-braking operation.

Clause 3B. The method of clause 2B, further comprising positioning a spring within the adjuster system.

Clause 4B. The method of any of clauses 1B-3B, further comprising fluidically connecting a hydraulic system configured to drive the piston to contact the heat sink during a braking operation.

Clause 5B. The method of any of clauses 1B-4B, further comprising positioning a piston cap to cover a first end of the piston proximate the heat sink, wherein the piston cap is configured to be disposed between the piston and the heat sink during a braking operation.

Clause 6B. The method of clause 5B, wherein the piston cap comprises a tough material such as steel.

Clause 7B. The method of any of clauses 1B-6B, wherein the heat sink comprises at least one of steel or carbon.

Clause 8B. The method of any of clauses 1B-7B, wherein the brake assembly comprises a plurality of pistons.

Clause 9B. The method of any of clauses 1B-8B, wherein the brake assembly defines a central axis, wherein the plurality of pistons are distributed radially about the central axis.

Various examples have been described. These and other examples are within the scope of the following claims.

What is claimed is:

1. A brake assembly comprising:
a heat sink;
a piston comprising a first end proximate the heat sink and a second opposite end;
a piston cap covering the first end of the piston, the piston cap including a shoulder extending radially from the piston; and
a retraction plate defining a lumen and a recess; wherein:
the piston is mechanically separated from the retraction plate,
the piston is configured to extend through the lumen defined by the retraction plate to contact the heat sink during a braking operation,
the piston is configured to contact the heat sink prior to the retraction plate contacting the heat sink during the braking operation, and
the shoulder of the piston cap is configured to seat within the recess of the retraction plate such that the retraction plate is displaced toward the heat sink with the piston during the braking operation.

2. The brake assembly of claim 1, further comprising an adjuster system configured to retract the piston from the heat sink by means of the retraction plate when the brake assembly is not in a braking operation.

3. The brake assembly of claim 2, wherein the adjuster system comprises a spring.

4. The brake assembly of claim 1, further comprising a hydraulic system configured to drive the piston to contact the heat sink during a braking operation.

5. The brake assembly of claim 1, wherein the piston cap is configured to be disposed between the piston and the heat sink during the braking operation.

6. The brake assembly of claim 5, wherein the piston cap comprises steel or titanium.

7. The brake assembly of claim 5, wherein the shoulder extends radially, relative to a central axis of the brake assembly, from the piston.

8. The brake assembly of claim 1, wherein the heat sink comprises at least one of steel, carbon, or a ceramic material.

9. The brake assembly of claim 1, wherein the brake assembly comprises a plurality of pistons.

10. The brake assembly of claim 9, wherein the brake assembly defines a central axis, wherein the plurality of pistons are distributed radially about the central axis.

11. The brake assembly of claim 1, wherein the retraction plate is configured to not contact the heat sink during a time period of the braking operation when the piston contacts the heat sink, such that vibration from the heat sink does not propagate from the heat sink through the retraction plate, thus reducing or eliminating impacts of vibration during the braking operation.

12. A method of making a brake assembly, the method comprising:
positioning a retraction plate adjacent to a heat sink, wherein the retraction plate defines a lumen and a recess;
positioning a piston adjacent to the retraction plate, the piston defining a first end proximate the heat sink and a second opposite end; and
covering the first end of the piston with a piston cap, the piston cap including a shoulder extending radially from the piston; wherein:
the piston is mechanically separated from the retraction plate,
the piston is configured to extend through the lumen defined by the retraction plate to contact the heat sink during a braking operation prior to the retraction plate contacting the heat sink, and
the shoulder of the piston cap is configured to seat within the recess of the retraction plate such that the retraction plate is displaced toward the heat sink with the piston during the braking operation.

13. The method of claim 12, further comprising mechanically supporting the retraction plate with an adjuster system, wherein the adjuster system is configured to retract the piston from the heat sink when the brake assembly is in a non-braking operation.

14. The method of claim 13, further comprising positioning a spring within the adjuster system.

15. The method of claim 12, further comprising fluidically connecting a hydraulic system configured to drive the piston to contact the heat sink during a braking operation.

16. The method of claim 12, wherein the piston cap is configured to be disposed between the piston and the heat sink during the braking operation.

17. The method of claim 16, wherein the piston cap comprises steel or titanium.

18. The method of claim 12, wherein the heat sink comprises at least one of steel, carbon, or a ceramic material.

19. The method of claim 12, wherein the brake assembly comprises a plurality of pistons.

20. The method of claim 19, wherein the brake assembly defines a central axis, and wherein the plurality of pistons are distributed radially about the central axis.

* * * * *